United States Patent
Passmann et al.

(10) Patent No.: US 11,526,177 B2
(45) Date of Patent: Dec. 13, 2022

(54) METHOD AND DEVICE FOR OPERATING A VEHICLE

(71) Applicant: Robert Bosch GmbH, Stuttgart (DE)

(72) Inventors: Christian Passmann, Diekholzen (DE); Jan Rohde, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 16/571,891

(22) Filed: Sep. 16, 2019

(65) Prior Publication Data

US 2020/0103919 A1 Apr. 2, 2020

(30) Foreign Application Priority Data

Sep. 28, 2018 (DE) .......................... 102018216795.8

(51) Int. Cl.
*G05D 1/02* (2020.01)
*G01C 21/30* (2006.01)
(Continued)

(52) U.S. Cl.
CPC .......... *G05D 1/0274* (2013.01); *G01C 21/30* (2013.01); *G05D 1/0088* (2013.01); *G06F 16/29* (2019.01);
(Continued)

(58) Field of Classification Search
CPC ...... G05D 1/0251; G06F 16/29; G01C 21/30; G01C 21/32; G01C 21/26; G01S 13/89;
(Continued)

(56) References Cited

U.S. PATENT DOCUMENTS

| | | | |
|---|---|---|---|
| 2008/0040003 A1* | 2/2008 | Kroeninger | B60R 21/0132 280/801.1 |
| 2013/0024104 A1* | 1/2013 | Stahlin | G01C 21/28 701/409 |

(Continued)

FOREIGN PATENT DOCUMENTS

| | | |
|---|---|---|
| DE | 102008012697 A1 | 6/2009 |
| DE | 102009008959 A1 | 9/2009 |

(Continued)

OTHER PUBLICATIONS

Definitions of "Plausibilization" from onelook.com showing Zero Hits in May 2021; 1 page.*

(Continued)

*Primary Examiner* — Alexander G Kalinowski
*Assistant Examiner* — Sanjeev Malhotra
(74) *Attorney, Agent, or Firm* — Norton Rose Fulbright US LLP; Gerard Messina

(57) ABSTRACT

A method and device for operating a vehicle comprising a step of recording environment data values, which represent an environment of the vehicle, the environment comprising at least one environmental feature; a step of determining a comparative value of a comparison between the at least one environmental feature and a map, the map comprising at least one map feature, the at least one environmental feature corresponding the at least one map feature; a step of determining an up-to-dateness of the map, based on a comparison of the comparative value with a threshold value; and a step of operating the vehicle, as a function of the up-to-dateness of the map.

21 Claims, 1 Drawing Sheet

(51) Int. Cl.
*G05D 1/00* (2006.01)
*G06F 16/29* (2019.01)
*G06V 20/56* (2022.01)

(52) U.S. Cl.
CPC ..... *G06V 20/56* (2022.01); *G05D 2201/0213* (2013.01)

(58) Field of Classification Search
CPC .... G01S 13/931; G01S 15/931; G01S 17/931; G01S 2013/9323; G01S 2013/9324; G01S 2013/93271; G07C 5/008
USPC ................ 701/45, 301, 409, 532; 705/7.42; 280/801.1
See application file for complete search history.

(56) References Cited

U.S. PATENT DOCUMENTS

| | | | | |
|---|---|---|---|---|
| 2015/0025787 | A1* | 1/2015 | Lehner | B60Q 9/008 701/301 |
| 2015/0199775 | A1* | 7/2015 | Pfeiffer | G06Q 10/06398 705/7.42 |
| 2016/0203716 | A1* | 7/2016 | Jeschke | B60W 40/072 701/532 |
| 2017/0137034 | A1* | 5/2017 | Yamaguchi | B60W 40/02 |
| 2017/0167888 | A1* | 6/2017 | Rander | G01C 21/3453 |
| 2017/0225678 | A1* | 8/2017 | Bariant | B60W 30/06 |
| 2017/0328719 | A1* | 11/2017 | Yamamuro | G01C 21/26 |
| 2018/0268625 | A1* | 9/2018 | Walker | G07C 5/0808 |
| 2018/0307915 | A1* | 10/2018 | Olson | G05D 1/0251 |
| 2019/0005588 | A1* | 1/2019 | Carver | G06Q 40/08 |
| 2019/0063928 | A1* | 2/2019 | Hasberg | G01S 7/412 |
| 2019/0101396 | A1* | 4/2019 | Mielenz | G01C 21/20 |
| 2019/0331499 | A1* | 10/2019 | Alawieh | G01C 21/3407 |
| 2020/0192400 | A1* | 6/2020 | Alawieh | G05D 1/0274 |

FOREIGN PATENT DOCUMENTS

| | | |
|---|---|---|
| DE | 102011116245 A1 | 4/2013 |
| DE | 102015220695 A1 | 4/2017 |
| WO | 2007065725 A1 | 6/2007 |

OTHER PUBLICATIONS

Definitions of "Plausibilize" from onelook.com showing Zero Hits in May 2021; 1 page.*
WO 2017 067767A1 (original German application) == Machine English Translation is attached herewith; 14pages.*
Norm SAE J3016 Jun. 15, 2018 Taxonomy and definitions for terms related to driving automation systems for on-road motor vehicles, pp. 1-35.

* cited by examiner

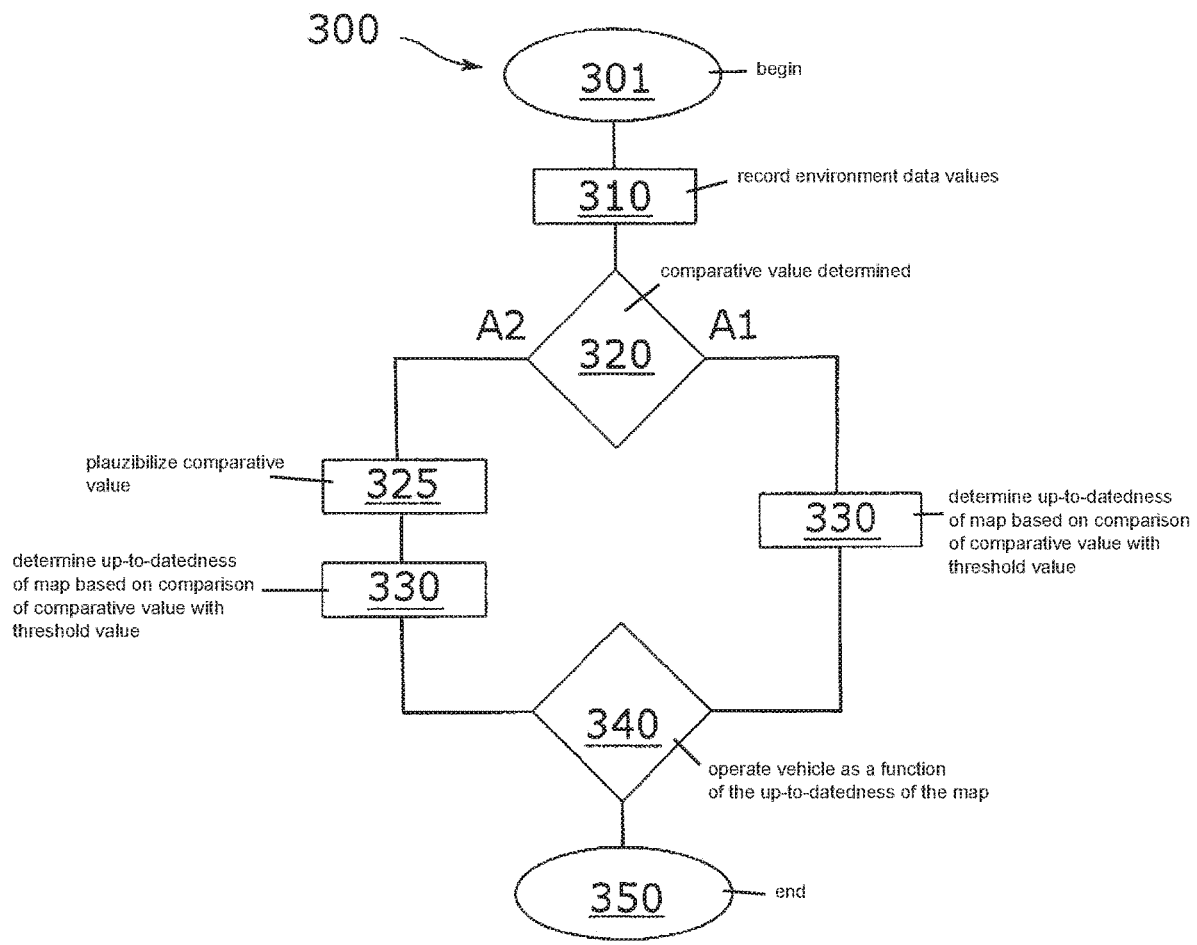

METHOD AND DEVICE FOR OPERATING A VEHICLE

CROSS REFERENCE

The present application claims the benefit under 35 U.S.C. § 119 of German Patent Application No. DE 102018216795.8 filed on Sep. 28, 2018, which is expressly incorporated herein by reference in its entirety.

FIELD

The present invention relates to a method and to a device for operating a vehicle, comprising a step of recording environment data values, the environment comprising at least one environmental feature; a step of determining a comparative value of a comparison between the at least one environmental feature and a map; a step of determining an up-to-dateness of the map; and a step of operating the vehicle as a function of the up-to-dateness of the map.

SUMMARY

An example method according to the present invention for operating a vehicle comprises a step of recording environment data values, which represent an environment of the vehicle, the environment comprising at least one environmental feature; and a step of determining a comparative value of a comparison between the at least one environmental feature and a map, the map comprising at least one map feature, the at least one environmental feature corresponding to the at least one map feature. The method furthermore comprises a step of determining an up-to-dateness of the map, based on a comparison of the comparative value with a threshold value, and a step of operating the vehicle as a function of the up-to-dateness of the map.

A vehicle is to be understood as a manually operated vehicle (developed in accordance with SAE level 0) or an automated vehicle (developed in accordance with one of SAE levels 1 through 5) (see SAE J3016 standard).

An environment of the vehicle is to be understood for example as at least one area which may be sensed by an environment sensor system of the vehicle. An environment may also be understood as a road section and/or larger areas (municipal districts, regions, etc.). An environmental feature is to be understood for example as an edifice (building, tunnel, bridge, etc.) and/or a traffic sign (traffic signal system, signs, etc.) and/or a piece of infrastructure (guardrail, roadway marking, etc.) and/or a landscape feature (hill, lake, river, forest, etc.).

A map is to be understood for example as a digital map, which exists in the form of (map) data values on a storage medium. This map is designed for example in such a way that one or multiple map layers are comprised, one map layer showing for example a map from a bird's-eye view (course and position of roads, buildings, landscape features, etc.). This corresponds for example to a map of a navigation system. Another map layer comprises for example a radar map, the environmental features depicted by the radar map being stored together with a radar signature. Another map layer comprises for example a LiDAR map, the environmental features depicted by the radar map being stored together with a LiDAR signature.

The map is developed in particular so as to be suitable for the navigation of a vehicle, in particular of an automated vehicle. For this purpose, the individual map layers comprise for example environmental features with a GPS position, this position being known with high accuracy. A highly accurate position is to be understood as a position, which within a specified coordinate system, for example GNSS coordinates, is so accurate that this position does not exceed a maximally admissible fuzziness. The maximum fuzziness may depend for example on the environment or on the number and/or embodiment of the environmental features. The maximum fuzziness may furthermore depend for example on the SAE level of the automated vehicle. Fundamentally, the maximum fuzziness is so small so as to ensure in particular a safe operation of the automated vehicle. For a fully automated operation of the automated vehicle (SAE level 5), the maximum fuzziness is in an order of magnitude of approximately 10 centimeters, for example.

An up-to-dateness of the map is to be understood as an agreement of at least a subsection of the map or at least a subsection of a map layer with at least a subsection of the environment of the vehicle. The map is considered up to date if this agreement, which is based on the comparison of the comparative value with the threshold value, satisfies a minimum agreement. If a change in the environment is not registered by an update of the map, the map becomes obsolete. In this case, the map is considered not up to date, which results in an impairment of the safety of map-based applications. For example, the up-to-dateness of the map is determined in that for example radar data values of the environment are recorded by a radar sensor, which is comprised by the environment sensor system, and these radar data values are compared to a radar map, which is comprised by the map as a map layer. To illustrate, this occurs for example in that the radar data values are superimposed in the form of an image recording (for example with corresponding color gradients and/or shapes and/or patterns and/or gray scales, etc.) with a type of image recording of the radar map, using a suitable computer program, and subsequently differences and agreements are determined. In the process, the agreement is compared as a factor, for example 0.95, with a minimum agreement, for example 0.9; the map in this example therefore being up to date.

The example method of the present invention may advantageously achieve the objective of checking the reliability and up-to-dateness of map data and of determining whether a reliable or safe operation of the vehicle, as a function of the map data, is ensured. Maps are becoming more and more important, in particular for automated driving, it being enormously important, especially for the acceptance of automated driving, to ensure the safety of the occupants and of the vehicle. Accurate maps that are always up to date play a particularly great role in this regard. The method of the present invention may achieves this objective by way of features described herein.

Preferably, a step is provided of determining a plausibilization of the comparative value, and the up-to-dateness is determined additionally as a function of the plausibilization.

This advantageously increases the reliability of the method by avoiding in particular faulty comparisons, which would yield the result for example that the map is not up to date when in fact it is up to date. This is important in particular when for example an extreme comparative value is determined because there exists a limitation of the environment sensor system.

Preferably, the threshold value is requested and received from an external server as a function of the comparative value and/or as a function of the plausibilization.

This demonstrates an advantage in that the processing power of a vehicle is hardly able to handle especially computing-intensive and resource-intensive methods. This poses no problem, however, for a server or a cloud (server network, etc.). This furthermore demonstrates the advantage that the server or the cloud is readily able to access additional information, which is required and/or helpful for determining a threshold value which is applicable for the environment, for example also as a function of the time of day and/or the time of the year, etc., and is correct in the sense of the method for ensuring a safe and reliable operation of the vehicle. Especially the time of day and/or the time of the year have a great effect on the comparative value due to the at times very different lighting conditions that affect the environment sensor system of the vehicle accordingly.

The plausibilization is preferably determined as a function of a direction of movement of the vehicle and/or as a function of a change in the direction of movement of the vehicle.

It is possible, for example, that the comparative value turns out to be too high or too low if the vehicle moves along an atypical direction of movement when the environment data values are recorded and/or if the vehicle performs an atypical change in movement and/or if the ascertained transformation between the sensor data and the map was determined incorrectly. Conversely, it is possible that a change in movement and/or incorrect transformations are detected via the environment data values and at the same time via another device comprised by the vehicle, which deviate for example in such an extreme manner from a previously implemented direction of movement and/or model assumptions that all the recorded environment data values are discarded as inadmissible.

This demonstrates the advantage that the reliability of the method is increased in that false comparative values are avoided or that the up-to-dateness is not falsely determined due to a false comparative value.

In one specific embodiment, in particular the detected environment data values are plausibilized in that a check is performed to determine whether the recorded environment data values are usable or not in the sense of the method.

Preferably, the threshold value is formed as a function of a state of the weather in the environment and/or a function of a state of traffic in the environment and/or a function a state of infrastructure in the environment and/or a function of a state of an environment sensor system of the vehicle.

The threshold values ascertained on the side of the vehicle are transmitted to the cloud system and are there processed into a statistic from an entire fleet of vehicles. This statistic is provided to the individual vehicle system in an advantageous embodiment of the system. Subsequently a suitable threshold value is determined on the vehicle side.

An environment sensor system is to be understood as at least one video sensor and/or at least one radar sensor and/or at least one Lidar sensor and/or at least one ultrasonic sensor and/or at least one further sensor that is designed to record the environment of the automated vehicle in the form of environment data values.

A state of the weather is to be understood for example a state that affects the performance of the environment sensor system negatively (bad visibility conditions, etc.). A state of traffic is to be understood for example as a traffic volume in the environment of the vehicle, which limits the functioning of the environment sensor system in such a way that a reliable recording of the environment data values is not ensured. A state of infrastructure is to be understood for example as the existence of a construction site and/or an assemblage of traffic signs and/or a broken guardrail, etc.

A state of the environment sensor system is to be understood for example in the sense of whether the environment sensor system is fully functional, or functional only in a limited way or not at all.

This demonstrates the advantage that the threshold value does not represent a static quantity, but rather a dynamic variable, which is determined and, if necessary, adapted, in accordance with the situation and/or as a function of the actual environment of the vehicle. This increases the reliability of the method and the safety in the operation of the vehicle. Moreover, in a conservative selection of the threshold value, many correct items of information would be discarded, which would result in a reduced performance of the map-based system. Another advantage of the method is thus a reduced influence on the system performance.

Preferably, the vehicle is operated in that a position of the vehicle is determined starting from a position of the map feature or in that a warning signal is output.

If the vehicle is developed as an automated vehicle, an operation of the vehicle is to be understood for example as an execution of the control function of the vehicle as a function of the position. This is to be understood for example in such a way that the vehicle is operated in a partially automated, highly automated or fully automated manner. The operation in this context comprises for example the determination of a trajectory for the vehicle and/or the driving of the trajectory by automated lateral and/or longitudinal control and/or the execution of safety-related driving functions, etc. Furthermore, an output of a warning signal is to be understood for example, depending on the design of the vehicle, in the sense that the warning signal is indicated to an occupant of the vehicle (for example a driver) visually and/or acoustically and/or haptically and/or is transmitted to a driving assistance system, an automated stop of the vehicle for example being brought about, etc.

This advantageously ensures that the map (or at least the respective map section) is not accessed if it is outdated. This increases safety in the operation of the vehicle.

The device according to the present invention, in particular a control unit, may be designed to perform all steps of the method.

The device comprises a processing unit (processor, working memory, hard disk) as well as suitable software for implementing the method according to example embodiments of the present invention. In one specific embodiment, the device comprises a transmitter and/or receiver unit, which is designed to exchange data values in particular with an external server or a cloud. In another specific embodiment, the device comprises a data interface, which is designed to exchange data values, in particular with an external server or a cloud, by way of a transmitter and/or receiver unit comprised by the vehicle. The device furthermore comprises an interface that is designed to register environment data values from an environment sensor system of the vehicle. In this context, registering the environment data values is to be understood for example in the sense that the environment data values are recorded by the environment sensor system and are received by the interface from the environment sensor system. The device furthermore comprises for example an interface, which is connected to a navigation device so as to make it possible to exchange map data values, which represent the map, between the device and the navigation device. In one specific embodiment, the map is comprised by the device in that it is stored on the hard disk for example. The device furthermore comprises an interface, which makes it possible to receive a state of the environment sensor system, it being possible to use the state to plausibilize the comparative value for example.

Moreover, a computer program is provided, comprising commands that prompt a computer, when executing the computer program, to implement a method in accordance with the present invention.

Furthermore, a machine-readable storage medium is provided, on which the computer program is stored.

Advantageous further developments of the present invention are described herein.

BRIEF DESCRIPTION OF THE DRAWINGS

Exemplary embodiments of the present invention are depicted in the figures and explained in greater detail below.

FIG. 1 shows an exemplary embodiment of the method according to the present invention in the form of a flow chart.

DETAILED DESCRIPTION OF EXAMPLE EMBODIMENTS

FIG. 1 shows an exemplary embodiment of a method 300 for operating a vehicle.

Method 300 begins with step 301.

In step 310, environment data values, which represent an environment of the vehicle, are recorded, the environment comprising at least one environmental feature.

In step 320, a comparative value of a comparison between the at least one environmental feature and a map is determined, the map comprising at least one map feature, the at least one environmental feature corresponding to the at least one map feature.

In a first specific embodiment A1 of method 300, step 320 is followed by step 330. In a second specific embodiment A2, step 320 is followed by step 325.

In step 325, a plauzibilization of the comparative value is determined.

In step 330, an up-to-dateness of the map is determined on the basis of a comparison of the comparative value with a threshold value. In one specific embodiment, the threshold value is requested and received from an external server.

In step 340, the vehicle is operated as a function of the up-to-dateness of the map.

Method 300 ends with step 350.

What is claimed is:

1. A method for operating a vehicle, comprising the following steps:
    recording environment data values, which represent an environment of the vehicle, the environment including at least one environmental feature including at least one of: a building, a tunnel, a bridge, a traffic signal system, a sign, a guardrail, a roadway marking, a hill, a lake, a river, or a forest;
    determining a comparative value of a comparison between the at least one environmental feature and a map, the map including at least one map feature, the at least one environmental feature corresponding to the at least one map feature;
    determining a plausibility of the comparative value of the comparison between the at least one environmental feature and the map;
    comparing the comparative value, of the comparison between the at least one environmental feature and the map, to a threshold value, wherein the threshold value is formed as a function of at least one of: a state of weather in the environment, a state of traffic in the environment, a state of infrastructure in the environment, or a state of an environment sensor system of the vehicle;
    determining an up-to-dateness of the map based on the comparison of the comparative value with the threshold value and based on the plausibility; and
    operating the vehicle as a function of the up-to-dateness of the map.

2. The method as recited in claim 1, wherein the threshold value is requested and received from an external server.

3. The method as recited in claim 1, wherein the plausibility is determined as a function of at least one of: a direction of movement of the vehicle, or a change in the direction of movement of the vehicle.

4. The method as recited in claim 1, wherein the operating of the vehicle is implemented in that a position of the vehicle is determined starting from a position of the map feature or in that a warning signal is output.

5. A control unit, configured to operate a vehicle, the control unit configured to:
    record environment data values, which represent an environment of the vehicle, the environment including at least one environmental feature including at least one of: a building, a tunnel, a bridge, a traffic signal system, a sign, a guardrail, a roadway marking, a hill, a lake, a river, or a forest;
    determine a comparative value of a comparison between the at least one environmental feature and a map, the map including at least one map feature, the at least one environmental feature corresponding to the at least one map feature;
    determine a plausibility of the comparative value of the comparison between the at least one environmental feature and the map;
    compare the comparative value, of the comparison between the at least one environmental feature and the map, to a threshold value, wherein the threshold value is formed as a function of at least one of: a state of weather in the environment, a state of traffic in the environment, a state of infrastructure in the environment, or a state of an environment sensor system of the vehicle;
    determine an up-to-dateness of the map based on the comparison of the comparative value with the threshold value and based on the plausibility; and
    operate the vehicle as a function of the up-to-dateness of the map.

6. A non-transitory machine-readable storage medium on which is stored a computer program for operating a vehicle, the computer program, when executed by a computer, causing the computer to perform the following steps:
    recording environment data values, which represent an environment of the vehicle, the environment including at least one environmental feature including at least one of: a building, a tunnel, a bridge, a traffic signal system, a sign, a guardrail, a roadway marking, a hill, a lake, a river, or a forest;
    determining a comparative value of a comparison between the at least one environmental feature and a map, the map including at least one map feature, the at least one environmental feature corresponding to the at least one map feature;
    determining a plausibility of the comparative value of the comparison between the at least one environmental feature and the map;
    comparing the comparative value, of the comparison between the at least one environmental feature and the map, to a threshold value, wherein the threshold value is formed as a function of at least one of: a state of weather in the environment, a state of traffic in the environment, a state of infrastructure in the environment, or a state of an environment sensor system of the vehicle;

determining an up-to-dateness of the map based on the comparison of the comparative value with the threshold value and based on the plausibility; and operating the vehicle as a function of the up-to-dateness of the map.

7. The method as recited in claim 1, wherein the threshold value is requested and received from an external server as a function of the comparative value.

8. The method as recited in claim 1, wherein the threshold value is requested and received from an external server as a function of the plausibility.

9. The control unit of claim 5, wherein the control unit is configured to request and receive the threshold value from an external server.

10. The control unit of claim 5, wherein the control unit is configured to determine the plausibility as a function of at least one of: a direction of movement of the vehicle, or a change in the direction of movement of the vehicle.

11. The non-transitory machine-readable storage medium as recited in claim 6, wherein the threshold value is requested and received from an external server.

12. The non-transitory machine-readable storage medium as recited in claim 6, wherein the plausibility is determined as a function of at least one of: a direction of movement of the vehicle, or a change in the direction of movement of the vehicle.

13. The method as recited in claim 1, wherein the plausibility is determined as a function of a direction of movement of the vehicle.

14. The method as recited in claim 1, wherein the plausibility is determined as a function of a change in the direction of movement of the vehicle.

15. The method as recited in claim 1, wherein the threshold value is formed as a function of at least one of: the state of weather in the environment, or the state of infrastructure in the environment.

16. The method as recited in claim 1, wherein the threshold value is formed as a function of the state of the weather in the environment.

17. The method as recited in claim 1, wherein the threshold value is formed as a function of the state of traffic in the environment.

18. The method as recited in claim 1, wherein the threshold value is formed as a function of the state of infrastructure in the environment.

19. The method as recited in claim 1, wherein the threshold value is formed as a function of the state of an environment sensor system of the vehicle.

20. The method as recited in claim 1, wherein the operating of the vehicle is at least partially automated, and the operating includes outputting a warning signal.

21. The method as recited in claim 1, wherein the recording the environment data values includes using an environment sensor system to record the environment data values, including at least one of: a radar sensor, a Lidar sensor, or an ultrasonic sensor.

* * * * *